United States Patent [19]
Fujino

[11] Patent Number: 5,296,988
[45] Date of Patent: Mar. 22, 1994

[54] OPTICAL HEAD WITH AN ADJUSTING MECHANISM FOR ADJUSTING THE POSITION OF AN OPTICAL MIRROR

[75] Inventor: Masahisa Fujino, Tokyo, Japan
[73] Assignee: Canon Kabushiki Kaisha, Tokyo, Japan
[21] Appl. No.: 882,895
[22] Filed: May 14, 1992
[30] Foreign Application Priority Data May 20, 1991 [JP] Japan .................................. 3-114593

[51] Int. Cl.$^5$ ...................... H02K 33/18; G11B 7/00
[52] U.S. Cl. .................................. 360/110; 360/114; 360/128; 369/44.14; 369/44.22
[58] Field of Search ............... 369/44.14, 44.11, 43, 369/44.21, 44.22; 360/110, 114, 128

[56] References Cited

U.S. PATENT DOCUMENTS

| | | | |
|---|---|---|---|
| 4,969,137 | 11/1990 | Sugiyama et al. | 369/44.11 |
| 5,031,165 | 7/1991 | Fujita | 369/44.13 |
| 5,060,213 | 10/1991 | Kamisada | 369/43 |
| 5,159,588 | 10/1992 | Nakano et al. | 369/44.14 |
| 5,168,490 | 12/1992 | Braat | 369/44.11 |

*Primary Examiner*—Constantine Hannaher
*Assistant Examiner*—Kim-Kwok Chu
*Attorney, Agent, or Firm*—Fitzpatrick, Cella, Harper & Scinto

[57] ABSTRACT

An optical head for information recording and/or reproduction has a light source, a deflecting mirror, an adjusting mechanism and an objective lens. A light beam generated by the light source is deflected by the deflecting mirror to be directed to a recording and/or reproducing surface of a recording medium while adjusting the position of the deflecting mirror by the adjusting mechanism. The light beam deflected by the deflecting mirror is converged on the recording and/or reproducing surface of the recording medium by the objective lens.

3 Claims, 5 Drawing Sheets

OPTICAL HEAD WITH AN ADJUSTING MECHANISM FOR ADJUSTING THE POSITION OF AN OPTICAL MIRROR

BACKGROUND OF THE INVENTION

1. Field of the Invention

The present invention relates to an optical information recording/reproducing apparatus for effecting recording and/or reproduction of information by utilizing a laser beam on a recording medium, and more particularly, to an optical head adapted for use in such apparatus.

2. Related Background Art

With the progress in increasing the capacity of information recording/reproducing apparatus, an optical disk memory is attracting attention as a high density recording medium. Information recording or reproduction with such an optical disk is generally conducted by radially moving an optical head with respect to the optical disk, and effecting tracking and focusing operations of a laser beam, emitted from said optical head, onto a desired track of the recording medium.

Though various methods have been proposed for moving such an optical head, a linear motor utilizing a voice coil is frequently employed for achieving high-speed access, in order to respond to the requirement of recording and retrieving data having a large capacity with a high speed. Also, for reducing the weight of the optical head itself, there has been realized an optical head of separate structure in which an objective lens and an optical path deflecting member alone are constructed as movable members while the laser light source, signal detection unit and other principal optical members are fixed on a frame member constituting a part of the apparatus.

Also, for realizing a higher response speed or a thinner structure, there is conceived a structure in which the objective lens contained in the movable unit is driven by a uniaxial actuator solely for focusing instead of a biaxial actuator for focusing and tracking, while the tracking operation is executed by the entire movable optical head.

In the following there will be given an explanation of the conventional optical information recording/reproducing apparatus (also called an optical disk apparatus) mentioned above, with reference to the attached drawings.

FIGS. 1, 2, 3 and 4 are respectively a perspective view, a plan view, a longitudinal cross-sectional view and a transversal cross-sectional view (along a line A—A in the plan view) of a conventional optical disk apparatus.

In these drawings there are shown an optical disk 1; an objective lens 2; a carriage 3 supported movably in the radial direction (arrow A) of the optical disk 1; a bobbin 4 on which the objective lens 2 is fixed; a focusing coil 5 fixed to the vertically movable bobbin 4 for focusing the objective lens 2 to the optical disk 1; paired parallel plate springs 6 respectively fixed to the bobbin 4 and the carriage 3, for supporting the bobbin 4 elastically and movably in the focusing direction (perpendicular to the plane of the drawing) with respect to the carriage 3; a driving coil 7 fixed to the carriage 3, for driving said carriage 3 in the radial direction (indicated by an arrow A) of the optical disk 1; laterally paired magnets 8 for generating a magnetic field acting on the focusing coil 5 and the driving coil 7; four guide shafts 9 fixed to the carriage 3; mutually opposed yokes 10 constituting a magnetic circuit in cooperation with the magnets 8 and also serving as a support mechanism for the carriage 3; steel balls 11 positioned between the guide shafts 9 and V-sectioned grooves 10a, 10b of the opposed yokes 10 and adapted to roll therebetween, thereby movably supporting the carriage 3 in the radial direction of the optical disk 1; rear yokes 12 supporting the magnets 8; intermediate yokes 13 connecting the opposed yokes 10 and rear yokes 12 thereby constituting a magnetic circuit; a triangular prism-shaped mirror 14, with a reflecting face 14a, for deflecting a light beam, projected parallel to the optical disk 1 from an unrepresented fixed head, into a perpendicular direction (optical axis direction of the objective lens 2), said mirror 14 being fixed, by a portion 14b thereof, to a fixing face 3a formed on the carriage 3; and a guide frame 15 serving to fix the opposed yokes 10 and rear yokes 12 thereby maintaining constant distances between said yokes and between the yokes 10.

For satisfying the optical performance required for information recording and reproduction, the objective lens employed in the optical head has to be adjusted within a precision of several minutes for the inclination of the optical axis of a light beam with respect to the optical disk constituting the information recording medium. Consequently, a precision within several minutes is required for the otical axis of the laser beam, which is projected from the fixed optical head, deflected perpendicularly to the optical disk by the triangular prism-shaped mirror and enters the objective lens.

In the above-explained conventional structure, however, since the triangular prism-shaped mirror is directly fixed on the carriage, there have been required highly precise components and an expensive and time-consuming assembling and adjusting operation in the construction of the support mechanism for the carriage, in order to attain the above-mentioned precision within several minutes.

SUMMARY OF THE INVENTION

In consideration of the foregoing, the object of the present invention is to provide an optical head enabling adjustment of inclination of the optical axis of the laser beam entering the objective lens with a simple configuration, without the necessity for highly precise components or for a time-consuming assembling operation. The above-mentioned object can be attained by an optical head for effecting information recording and/or reproduction utilizing a laser beam and a recording medium, comprising a light source; a deflecting mirror for deflecting a laser beam, generated by said light source, toward a recording and/or reproducing surface of the recording medium; and adjusting mechanism for adjusting the position of said deflecting mirror; and an objective lens for focusing the laser beam, deflected by said deflecting mirror, onto the recording and/or reproducing surface of said recording medium.

DETAILED DESCRIPTION OF THE PREFERRED EMBODIMENTS

Figure 1:
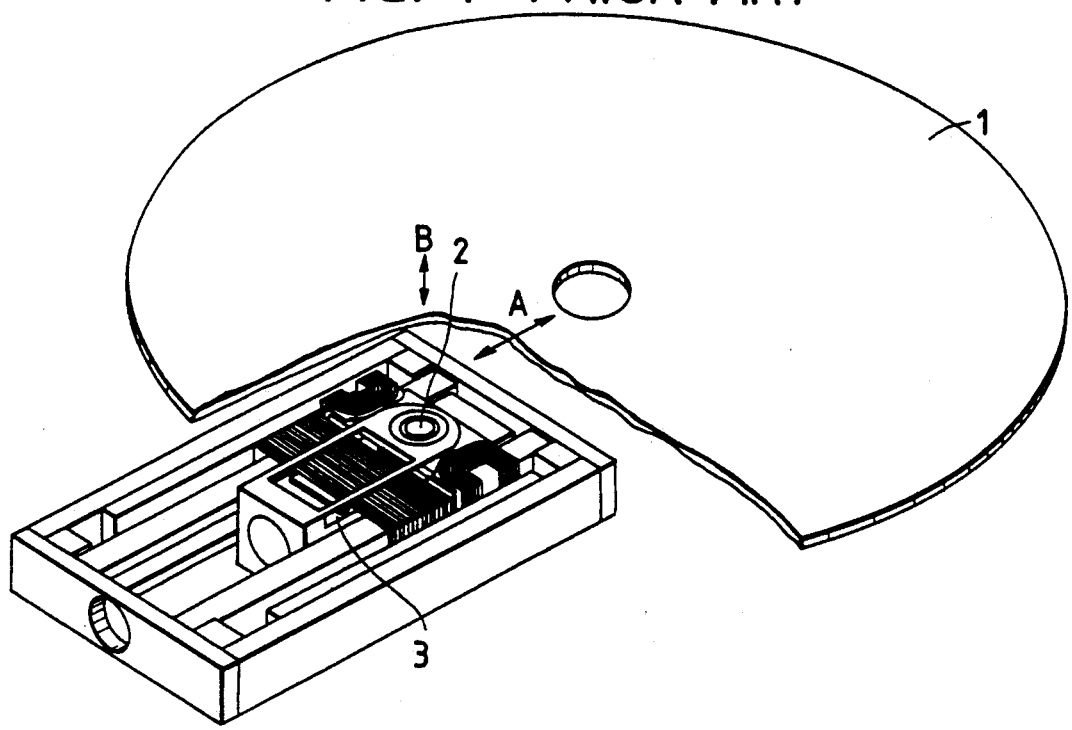
FIG. 1 is an entire perspective view of a movable optical head unit in a conventional optical head.
Figure 2:
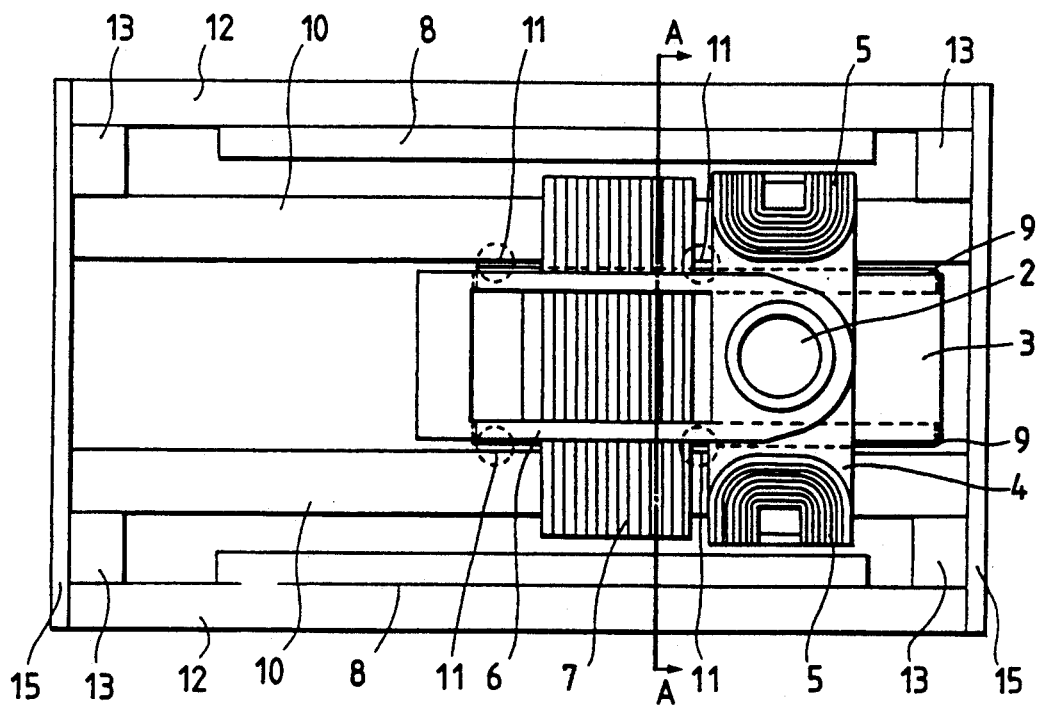
FIG. 2 is a plan view of the movable optical head shown in FIG. 1.
Figure 3:
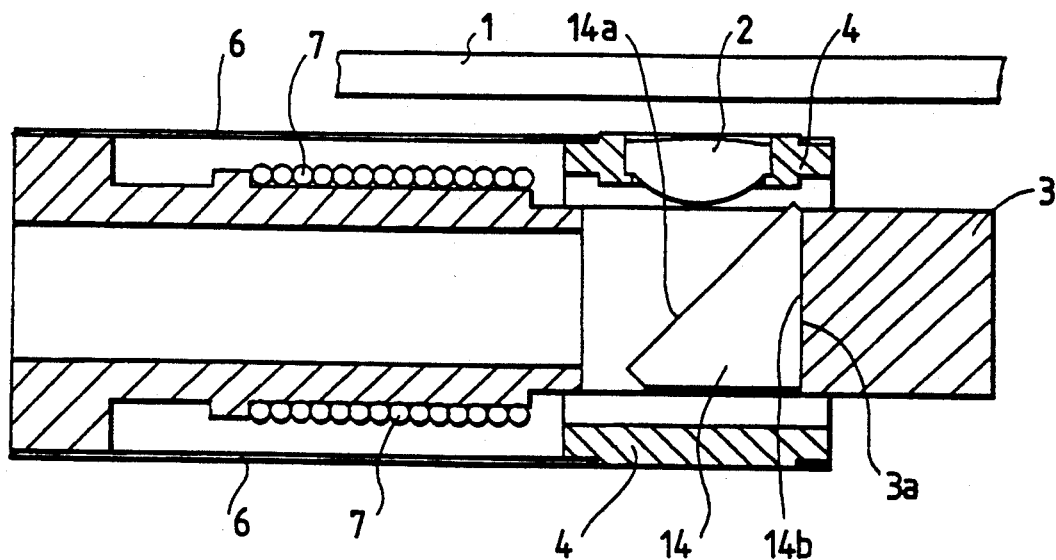
FIG. 3 is a longitudinal cross-sectional view of the movable optical head shown in FIG. 1.
Figure 4:
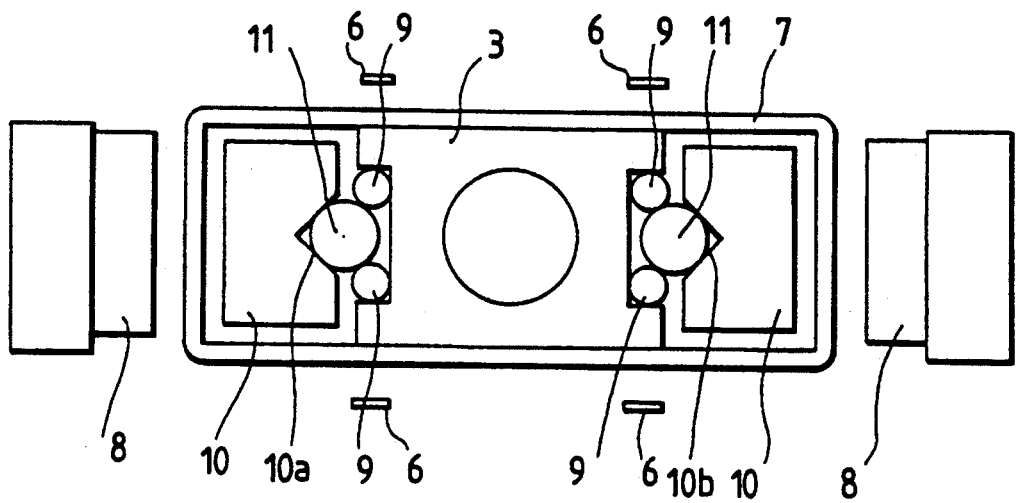
FIG. 4 is a cross-sectional view along a line A—A in FIG. 2.
Figure 5:
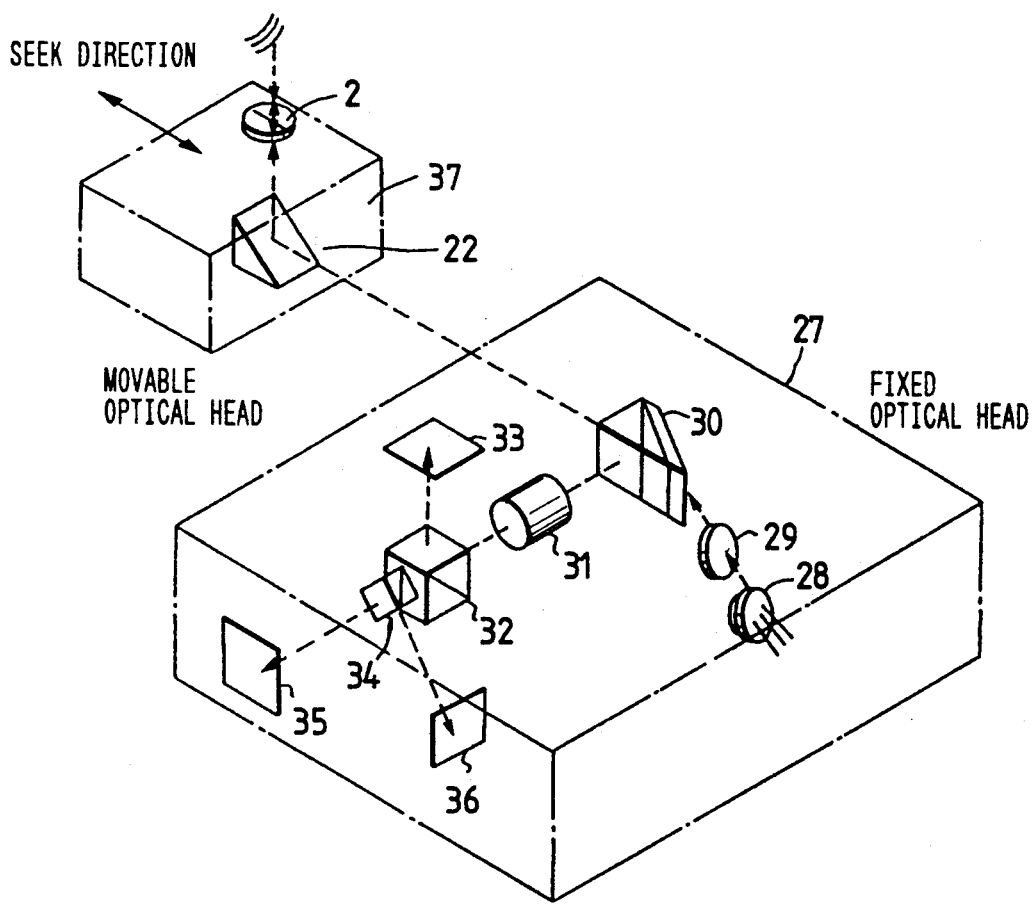
FIG. 5 is an entire perspective view of an embodiment of the optical head of the present invention.
Figure 6:
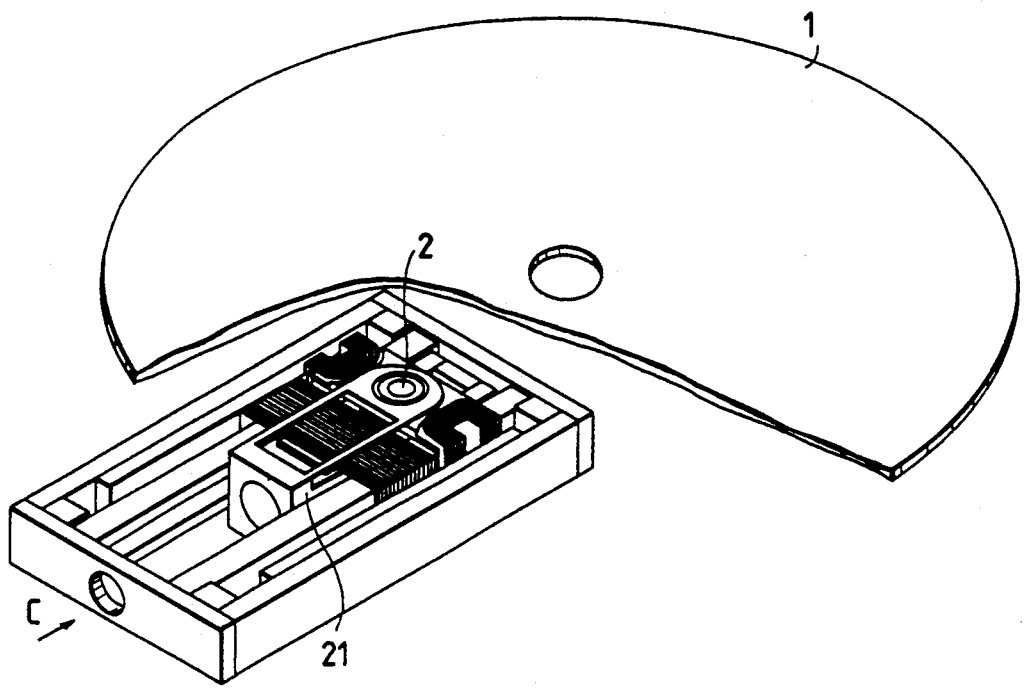
FIG. 6 is an entire perspective view of a movable optical head unit in the optical head shown in FIG. 5.
Figure 7:
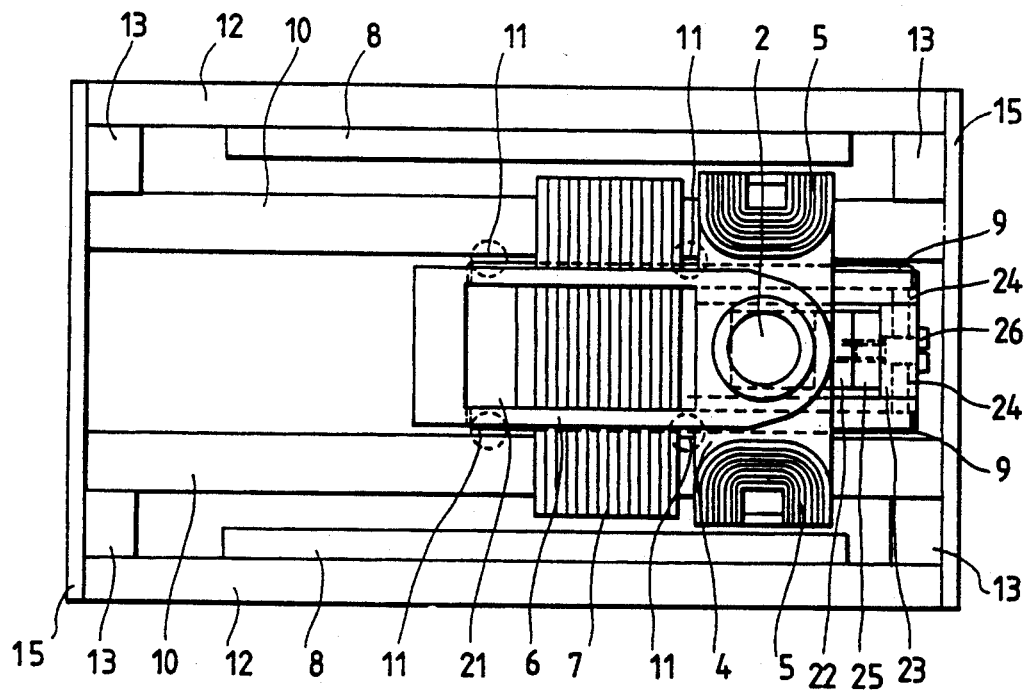
FIG. 7 is plan view of the movable optical head shown in FIG. 5.
Figure 8:
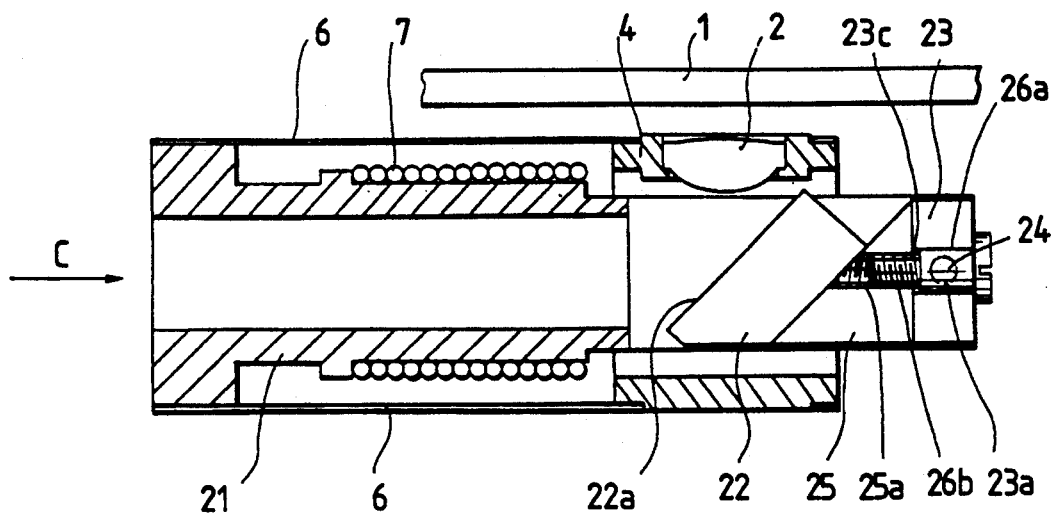
FIG. 8 is a longitudinal cross-sectional view of the movable optical head shown in FIG. 6.

FIG. 5 is a perspective view of the entire optical head of the present invention, and FIGS. 6, 7, 8 and 9 are respectively a perspective view, a plan view, a longitudinal cross-sectional view and an exploded perspective view of a movable optical head unit of said optical head.

In these drawings, components equivalent in function to those in the foregoing conventional configuration are represented by the same reference numerals, and will not be explained further.

In FIG. 5, there is shown a fixed optical head 27 which is fixed to the frame of the apparatus and which includes therein a light source 28 for generating a laser beam in a direction parallel to the record/reproduction plane of the optical disk 1; a collimating lens 29 for converting the laser beam, generated from said light source, into a parallel beam; a beam splitter 30 for separating a light beam reflected from the optical disk, from the incident light beam to the optical disk; a sensor lens 31 for converging the reflected light beam onto a sensor; and beam splitters 32, 34 for splitting the reflected light beam for entry into RF and servo sensors 33, 35, 36. Also, there is shown a movable optical head unit 37.

FIGS. 6 to 9 illustrate the details of said movable optical head 37. There are shown a carriage 21 movably supported parallel to the radial direction of the optical disk 1; a flat mirror 22, with a relecting surface 22a, for deflecting the light beam, projected from the unrepresented fixed optical head in a direction C parallel to the optical disk 1, into a direction perpendicular thereto; an adjusting table 23 rotatably supported on the carriage 21 by means of a pin 24 which is perpendicular to the optical axis of the light beam, projected from the fixed optical head in a parallel manner to the recording surface of the optical disk 1 supported on an unrepresented turntable, and is parallel to the recording surface of said optical disk 1; a pin 24 for rotatably supporting the adjusting table 23 on the carriage 21, and fitted in holes 21a, 21b of the carriage 21 and holes 23a, 23b of the adjusting table 23; a rotatable adjusting table 25 supporting the flat mirror 22 and rotatably supported by the adjusting table 23 about the optical axis of the light beam projected from the fixed optical head in a parallel manner to the recording surface of the optical disk 1 placed on the unrepresented turntable; and a support screw 26 for supporting the rotatable adjusting table 25 on the adjusting table 23, with a shaft portion 26a fitted in a hole 23c of the adjusting table 23 and a screw portion 26b screwed into a female screw 25a of the rotatable adjusting table 25.

Figure 9:
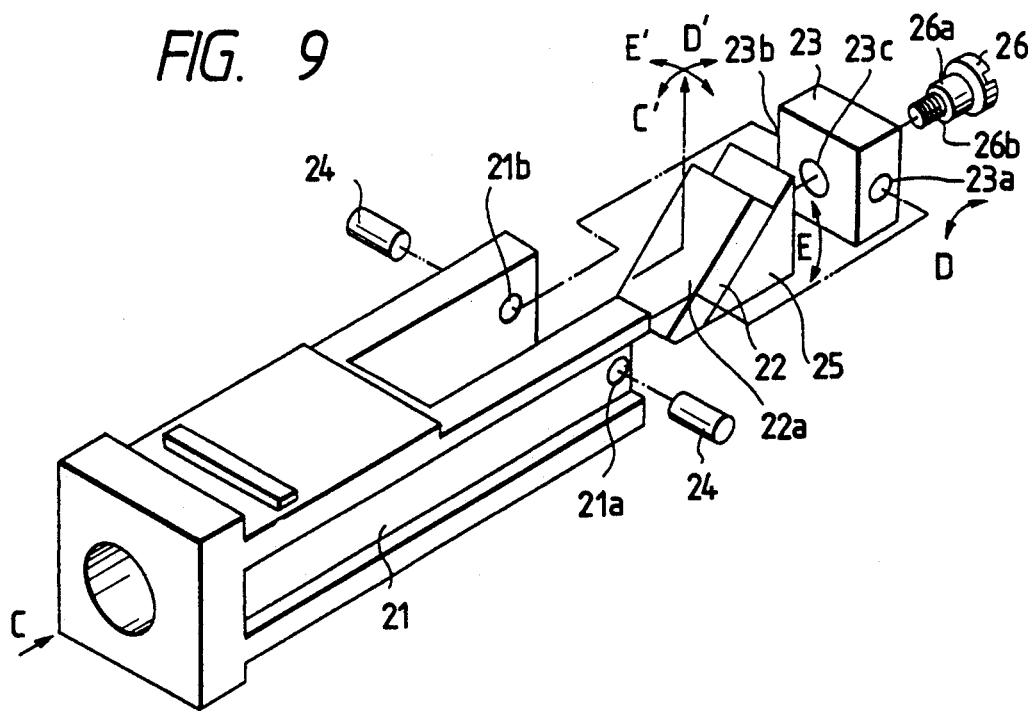
FIG. 9 is an exploded perspective view of the movable optical head shown in FIG. 6.

In the above-explained structure, as shown in FIG. 9, the adjusting table 23 is rotatable about the pin 24 (indicated by an arrow D), so that the light beam C' deflected by the flat mirror 22 and substantially perpendicularly entering the optical disk 1 can be adjusted in a direction D'. Also, since the rotatable adjusting table 25 is rotatable about the axis of the fixing screw 26 (indicated by an arrow E), the light beam C' deflected by the flat mirror 22 can be adjusted in a direction E'. Consequently, the optical axis of the deflected light beam C' can be adjusted in all the directions by the combination of the above-mentioned adjustments.

As explained in the foregoing, the optical head of the present invention is provided with an adjusting mechanism for adjusting the position of a mirror for deflecting the laser beam from the light source into a direction perpendicular to the optical disk, thereby dispensing with highly precise components and facilitating the assembling operation.

What is claimed is:

1. An optical head for effecting information recording and/or reproducing by using a laser beam emitted from a light source, which is converged by an objective lens to irradiate an optical disk, said optical head comprising:

a carriage for supporting the objective lens and for moving the objective lens in a radial direction with respect to the optical disk;

a deflection mirror, mounted on said carriage, for deflecting the laser beam emitted from the light source toward the objective lens; and an adjusting mechanism, mounted on said carriage, for adjusting a posture of said deflection mirror on said carriage, said adjusting mechanism comprising: (i) a mirror supporting base for supporting said deflection mirror, (ii) a first adjusting mechanism for causing said mirror supporting base to pivot about an axis that is perpendicular to the optical axis of the laser beam emitted from the light source and that is parallel to a recording surface of the optical disk and (iii) a second adjusting mechanism for causing said mirror supporting base to pivot about the optical axis of the laser beam emitted from the light source.

2. An optical head according to claim 1, wherein said optical head is a separation type optical head comprising a stationary optical head and a movable optical head, and wherein the light source is provided on said stationary optical head, while said carriage, said deflecting mirror, said adjusting mechanism and said objective lens are provided on said movable optical head.

3. An information recording/reproducing apparatus for effecting at least one of recording and reproducing of information by using a laser beam emitted from a light source, which is converged by an objective lens to irradiate an optical disk, said apparatus comprising:

a carriage for supporting the objective lens and for moving the objective lens in a radial direction with respect to the disk;

a deflection mirror, mounted on said carriage, for deflecting the laser beam emitted from the light source toward the objective lens; and an adjusting mechanism, mounted on said carriage, for adjusting a posture of said deflection mirror on said carriage, said adjusting mechanism comprising: (i) a mirror supporting base for supporting said deflection mirror, (ii) a first adjusting mechanism for causing said mirror supporting base to pivot about an axis that is perpendicular to the optical axis of the laser beam emitted from the light source and that is parallel to a recording surface of the disk; and (iii) a second adjusting mechanism for causing said mirror supporting base to pivot about the optical axis of the laser beam emitted from the light source.

* * * * *